United States Patent
Watanabe et al.

(10) Patent No.: US 12,012,207 B2
(45) Date of Patent: Jun. 18, 2024

(54) INSPECTION DEVICE, INSPECTION METHOD, AND PROGRAM

(71) Applicant: NIPPON TELEGRAPH AND TELEPHONE CORPORATION, Tokyo (JP)

(72) Inventors: Kazuaki Watanabe, Tokyo (JP); Yujin Hamano, Tokyo (JP); Daisuke Uchibori, Tokyo (JP); Masafumi Nakagawa, Tokyo (JP); Atsushi Aratake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 92 days.

(21) Appl. No.: 17/911,619

(22) PCT Filed: Mar. 16, 2020

(86) PCT No.: PCT/JP2020/011517
§ 371 (c)(1),
(2) Date: Sep. 14, 2022

(87) PCT Pub. No.: WO2021/186507
PCT Pub. Date: Sep. 23, 2021

(65) Prior Publication Data
US 2023/0175247 A1    Jun. 8, 2023

(51) Int. Cl.
*B64C 39/02* (2023.01)
*B64U 30/20* (2023.01)
(Continued)

(52) U.S. Cl.
CPC .............. *B64C 39/02* (2013.01); *B64U 30/20* (2023.01); *E03F 7/00* (2013.01); *B64U 2101/30* (2023.01);
(Continued)

(58) Field of Classification Search
CPC ....... E03F 7/00; B64U 30/20; B64U 2201/10; B64U 2201/20; B64U 2101/30; B64U 2101/024; B64U 10/13; B64U 39/02
See application file for complete search history.

(56) References Cited

U.S. PATENT DOCUMENTS 9,738,381 B1 *  8/2017  Loud ................... G05D 1/0094
11,703,412 B1 *  7/2023  Dillingham ........... G01M 3/002
                                                              73/40.5 R
(Continued)

FOREIGN PATENT DOCUMENTS

KR      101861045 B1 *  6/2018  ........... G05D 1/0005
KR      101960021 B1 *  3/2019  ............. H04N 7/183
WO   WO-2017199940 A1 * 11/2017  ................ E03F 7/00

OTHER PUBLICATIONS

Uchibori et al. (2019) "Development of Automatic Inspection Technology for Communication Manholes by Drone" Proceedings of the 19th Construction Robot Symposium, Oct. 2019.
(Continued)

*Primary Examiner* — Benjamin P Lee

(57) ABSTRACT

An inspection apparatus (100) according to an aspect of the present invention includes a first determination unit (121) that determines an operation of an unmanned aerial vehicle (1) based on a first threshold for determining whether the unmanned aerial vehicle (1) can enter the inside, a second threshold, which is greater than the first threshold, for determining whether the unmanned aerial vehicle (1) can land on a water surface of pooled water in the inside, and space information indicating a space of the inside, and a second determination unit (122) that determines a flight altitude of the unmanned aerial vehicle (1) with respect to the water surface or a floor surface of the manhole after the unmanned aerial vehicle (1) enters the inside based on the first and second thresholds, and the space information in a case where it has been determined that the unmanned aerial vehicle (1) can enter the inside and cannot land on the water surface.

20 Claims, 7 Drawing Sheets

(51) Int. Cl.
*E03F 7/00* (2006.01)
*B64U 101/30* (2023.01)
(52) U.S. Cl.
CPC ...... *B64U 2201/10* (2023.01); *B64U 2201/20* (2023.01)

(56) References Cited

U.S. PATENT DOCUMENTS

| | | | | |
|---|---|---|---|---|
| 2021/0061463 | A1* | 3/2021 | Briod | B64D 47/08 |
| 2021/0129987 | A1* | 5/2021 | Foong | B64U 20/87 |
| 2021/0147078 | A1* | 5/2021 | Kuroiwa | H04N 7/181 |
| 2022/0097845 | A1* | 3/2022 | Honda | B64D 47/08 |
| 2023/0016847 | A1* | 1/2023 | Sevar | G01C 13/006 |
| 2023/0110109 | A1* | 4/2023 | Watanabe | B64U 20/80 |
| | | | | 244/121 |
| 2023/0121833 | A1* | 4/2023 | Watanabe | B60F 5/02 |
| | | | | 244/101 |
| 2023/0175247 | A1* | 6/2023 | Watanabe | B64U 30/20 |
| | | | | 244/17.23 |
| 2023/0331382 | A1* | 10/2023 | Uchibori | B64C 39/024 |

OTHER PUBLICATIONS

Prodrone Co., Ltd. "PD4-AW-AQ" literature [online] Accessed on Jan. 7, 2020, website: https://www.prodrone.com/jp/products/pd4-aw-aq/.

* cited by examiner

INSPECTION DEVICE, INSPECTION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/011517, filed on 16 Mar. 2020, the disclosure of which is hereby incorporated herein by reference in its entirety.

TECHNICAL FIELD

The present invention relates to an inspection apparatus, an inspection method, and a program.

BACKGROUND ART

An inspection method for inspecting the inside of a manhole for communication using an autonomous flight type unmanned aerial vehicle is known in the related art (for example, see NPL 1). This inspection method involves causing an unmanned aerial vehicle to enter the inside of a manhole to automatically capture images of states of an upper slab of a skeleton part that is one part of manhole to be inspected, and the like, using a camera mounted on the unmanned aerial vehicle. The operator can check for cracking or the like taking place on the upper slab from the captured images. By the way, there may be pooled water in the inside of the manhole because underground water or rainwater flows into the inside. In such a case, the worker has to drain the pooled water from the inside of the manhole before the unmanned aerial vehicle enters the inside of the manhole in order to ensure the flight space for the unmanned aerial vehicle in the inside of the manhole, which may take a large amount of time until actual inspection work begins.

For this reason, a method of using an unmanned aerial vehicle capable of landing on a surface of pooled water to inspect the inside of a manhole has been proposed (for example, see NPL 2).

CITATION LIST

Non Patent Literature

NPL 1: Daisuke Uchibori and 4 others, "Development of Automatic Inspection of Communication Manhole using Drone" Proceedings of the 19th Symposium on Construction Robotics in Japan (USB), O2-02, October 2019

NPL 2: "PD4-AW-AQ", Prodrone Co., Ltd., [online], [retrieved on Mar. 9, 2020], Internet URL:https://www-.prodrone.com/jp/products/pd4-aw-aq/>

SUMMARY OF THE INVENTION

Technical Problem

However, states of the insides of manholes such as whether there is pooled water in the inside of a manhole or how deep pooled water is if the inside of the manhole has pooled water vary depending on manholes. Thus, even though an unmanned aerial vehicle tries to enter the insides of all manholes and land on the surface of pooled water as in the related art, for example, if the depth of pooled water is shallow, the long distance from the unmanned aerial vehicle to the upper slab of the manhole prevents the unmanned aerial vehicle from taking a close shot of the upper slab, making it difficult to capture an image of fine cracking or the like. In addition, for example, in a case in which there is no pooled water in the inside of the manhole, the unmanned aerial vehicle lands on the lower slab of the manhole, making it difficult to capture an image of the inside of the manhole while moving therein.

That is to say, there is demand for an inspection apparatus capable of automatically ascertaining the state of the inside of a manhole when causing an unmanned aerial vehicle to enter the inside of the manhole and appropriately determining an operation of the unmanned aerial vehicle in accordance with the state of the inside of the manhole, for example, whether to cause the unmanned aerial vehicle to land on the ground surface without causing it to enter the inside when it is full of water, cause the unmanned aerial vehicle to land on the surface of pooled water when the depth of pooled water is deep, or cause the unmanned aerial vehicle to fly in the space of the inside of the manhole when the depth of pooled water is shallow.

Taking the above-described circumstances into consideration, an objective of the present disclosure is to provide an inspection apparatus, an inspection method, and a program capable of appropriately determining an operation of an unmanned aerial vehicle in accordance with a state of the inside of a manhole.

Means for Solving the Problem

According to an embodiment, inspection apparatus configured to inspect an inside of a manhole using an unmanned aerial vehicle includes: a first determination unit configured to determine an operation of the unmanned aerial vehicle based on a first threshold for determining whether the unmanned aerial vehicle can enter the inside, a second threshold for determining whether the unmanned aerial vehicle can land on a water surface of pooled water in the inside, and space information indicating a space of the inside, the second threshold being greater than the first threshold; and a second determination unit configured to determine a flight altitude of the unmanned aerial vehicle with respect to the water surface or a floor surface of the manhole after the unmanned aerial vehicle enters the inside based on the first threshold, the second threshold, and the space information in a case in which it has been determined that the unmanned aerial vehicle can enter the inside and land on the water surface.

According to an embodiment, an inspection method for inspecting an inside of a manhole using an unmanned aerial vehicle includes: determining an operation of the unmanned aerial vehicle based on a first threshold for determining whether the unmanned aerial vehicle can enter the inside, a second threshold for determining whether the unmanned aerial vehicle can land on a water surface of pooled water in the inside, and space information indicating a space of the inside, the second threshold being greater than the first threshold; and determining a flight altitude of the unmanned aerial vehicle with respect to the water surface or a floor surface of the manhole after the unmanned aerial vehicle enters the inside based on the first threshold, the second threshold, and the space information in a case in which it has been determined that the unmanned aerial vehicle can enter the inside and land on the water surface.

A program according to an embodiment causes a computer to function as the inspection apparatus.

Effects of the Invention

According to the present disclosure, it is possible to provide an inspection apparatus, an inspection method, and a program capable of appropriately determining an operation of an unmanned aerial vehicle in accordance with a state of the inside of a manhole.

DESCRIPTION OF EMBODIMENTS

Figure 1:
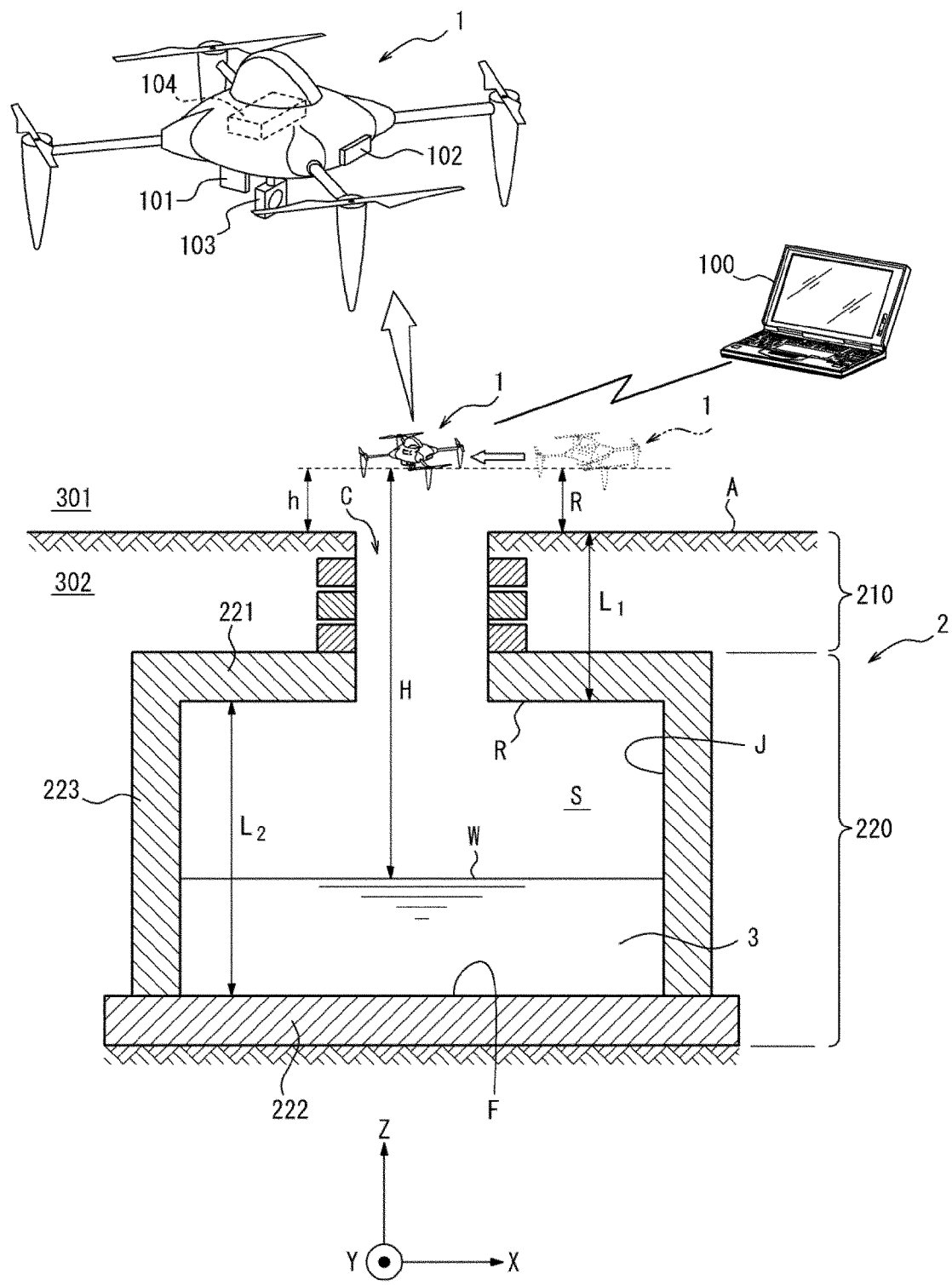
FIG. 1 is a diagram illustrating an exemplary configuration of an inspection system according to an embodiment.

Hereinafter, an embodiment for carrying out the present invention will be described with reference to the accompanying drawings. Further, "upper", "lower", and "vertical" in the following description refer to directions parallel to the Z axis of the coordinate axis representations depicted in the drawings, and "horizontal" refers to a direction parallel to the X-Y plane of the coordinate axis representation depicted in the drawings.

Configuration of Inspection System

A configuration of an inspection system according to an embodiment of the present invention will be described with reference to FIG. 1.

The inspection system is a system for inspecting the inside of a manhole 2. The inspection system includes an inspection apparatus 100 and an unmanned aerial vehicle 1 as illustrated in FIG. 1. The inspection apparatus 100 and the unmanned aerial vehicle 1 are communicably connected in a wired or wireless manner.

Here, a configuration of the manhole 2 buried in the underground 302 will be described briefly.

The manhole 2 is, for example, a standard communication manhole. The manhole 2 includes a neck part 210, a skeleton part 220, and the like. The neck part 210 has a substantially cylindrical shape, for example, and the skeleton part 220 has a substantially rectangular parallelepiped shape, for example. The neck part 210 and the skeleton part 220 are made of reinforced concrete. The skeleton part 220 includes an upper slab 221, a lower slab 222, and a sidewall part 223.

The inside of the manhole 2 is surrounded by a ceiling surface R of the upper slab 221 of the skeleton part 220, a wall surface J of the sidewall part 223 of the skeleton part 220, a floor surface F of the lower slab 222 of the skeleton part 220, and the like. A space S of the inside of the manhole 2 is surrounded by the ceiling surface R of the upper slab 221 of the skeleton part 220, part of the wall surface J of the sidewall part 223 of the skeleton part 220, a water surface W of pooled water 3 in the inside of the manhole 2, and the like. A burial depth $L_1$ of the manhole 2 indicates the distance from a ground surface A to the ceiling surface R. A height $L_2$ of the inside of the manhole 2 indicates the distance from the ceiling surface R to the floor surface F.

The unmanned aerial vehicle 1 is, for example, an unmanned aerial vehicle of an autonomous flight type. The unmanned aerial vehicle 1 includes a first rangefinder 101, a second rangefinder 102, a camera 103, a flight control unit 104, and other known constituent components such as motors, propellers, and the like. A configuration of the unmanned aerial vehicle 1 is not limited to a particular configuration.

The first rangefinder 101 measures an altitude h (first altitude) of the unmanned aerial vehicle 1 with respect to the ground surface A before the unmanned aerial vehicle 1 enters the inside of the manhole 2, that is, when the unmanned aerial vehicle 1 is flying aboveground 301. The altitude h of the unmanned aerial vehicle 1 with respect to the ground surface A indicates the distance from the ground surface A to the unmanned aerial vehicle 1. Examples of the first rangefinder 101 include a GPS sensor, an air pressure sensor, a gyroscopic sensor, an ultrasonic sensor, and the like. The first rangefinder 101 is disposed in the airframe of the unmanned aerial vehicle 1, for example, on an upper part thereof in the vertical direction, a lower part thereof in the vertical direction, a side part thereof in the horizontal direction, or the like. Because the unmanned aerial vehicle 1 has the first rangefinder 101, the unmanned aerial vehicle 1 can autonomously fly directly above a manhole hole C while maintaining a predetermined altitude h from the ground surface A (see the white arrow in FIG. 1).

The second rangefinder 102 measures an altitude H (second altitude) of the unmanned aerial vehicle 1 with respect to the water surface W or the floor surface F before the unmanned aerial vehicle 1 enters the inside of the manhole 2, that is, when the unmanned aerial vehicle 1 is flying directly above the manhole hole C. The altitude H of the unmanned aerial vehicle 1 with respect to the water surface W or the floor surface F indicates the distance from the water surface W or the floor surface F to the unmanned aerial vehicle 1. When there is pooled water 3 in the inside of the manhole 2, for example, the second rangefinder 102 measures the altitude H of the unmanned aerial vehicle 1 with respect to the water surface W. When there is no pooled water 3 in the inside of the manhole 2, for example, the second rangefinder 102 measures the altitude H of the unmanned aerial vehicle 1 with respect to the floor surface F. Examples of the second rangefinder 102 include an ultrasonic sensor, a laser sensor, and the like. The second rangefinder 102 is disposed in the airframe of the unmanned aerial vehicle 1, for example, on an upper part thereof in the vertical direction, a lower part thereof in the vertical direction, a side part thereof in the horizontal direction, or the like.

The camera 103 captures, for example, images of the ceiling surface R of the upper slab 221 of the skeleton part 220, the wall surface J of the sidewall part 223 of the skeleton part 220, the manhole hole C, and the like. The camera 103 is disposed in the airframe of the unmanned aerial vehicle 1, for example, on an upper part thereof in the vertical direction, a lower part thereof in the vertical direction, a side part thereof in the horizontal direction, or the like.

The flight control unit 104 is, for example, a small computer. The flight control unit 104 controls the various sensors described above, controls drive of the motors, rotation speeds and rotation directions of the propellers, and the like, based on sensor information acquired from the various sensors for autonomous flight. In addition, the flight control unit 104 controls each part of the unmanned aerial vehicle 1 based on, for example, a control signal for causing the unmanned aerial vehicle 1 to land on the ground surface A, a control signal for causing the unmanned aerial vehicle 1 to land on the water surface W, a control signal for causing the unmanned aerial vehicle 1 to fly in the space S of the inside of the manhole, a control signal for controlling a flight altitude of the unmanned aerial vehicle 1, and the like.

The unmanned aerial vehicle 1 has a function of communicating with the inspection apparatus 100. The unmanned aerial vehicle 1 transmits, for example, distance information (first distance information) indicating the altitude h of the unmanned aerial vehicle 1 with respect to the ground surface A measured by the first rangefinder 101, distance information (second distance information) indicating the altitude H of the unmanned aerial vehicle 1 with respect to the water surface W or the floor surface F measured by the second rangefinder 102, image information of images captured by the camera 103, and the like to the inspection apparatus 100. In addition, the unmanned aerial vehicle 1 receives, for example, a control signal for causing the unmanned aerial vehicle 1 to land on the ground surface A, a control signal for causing the unmanned aerial vehicle 1 to land on the water surface W, a control signal for causing the unmanned aerial vehicle 1 to fly in the space S of the inside of the manhole, a control signal for controlling a flight altitude of the unmanned aerial vehicle 1, and the like from the inspection apparatus 100.

Configuration of Inspection Apparatus 100

Figure 2:
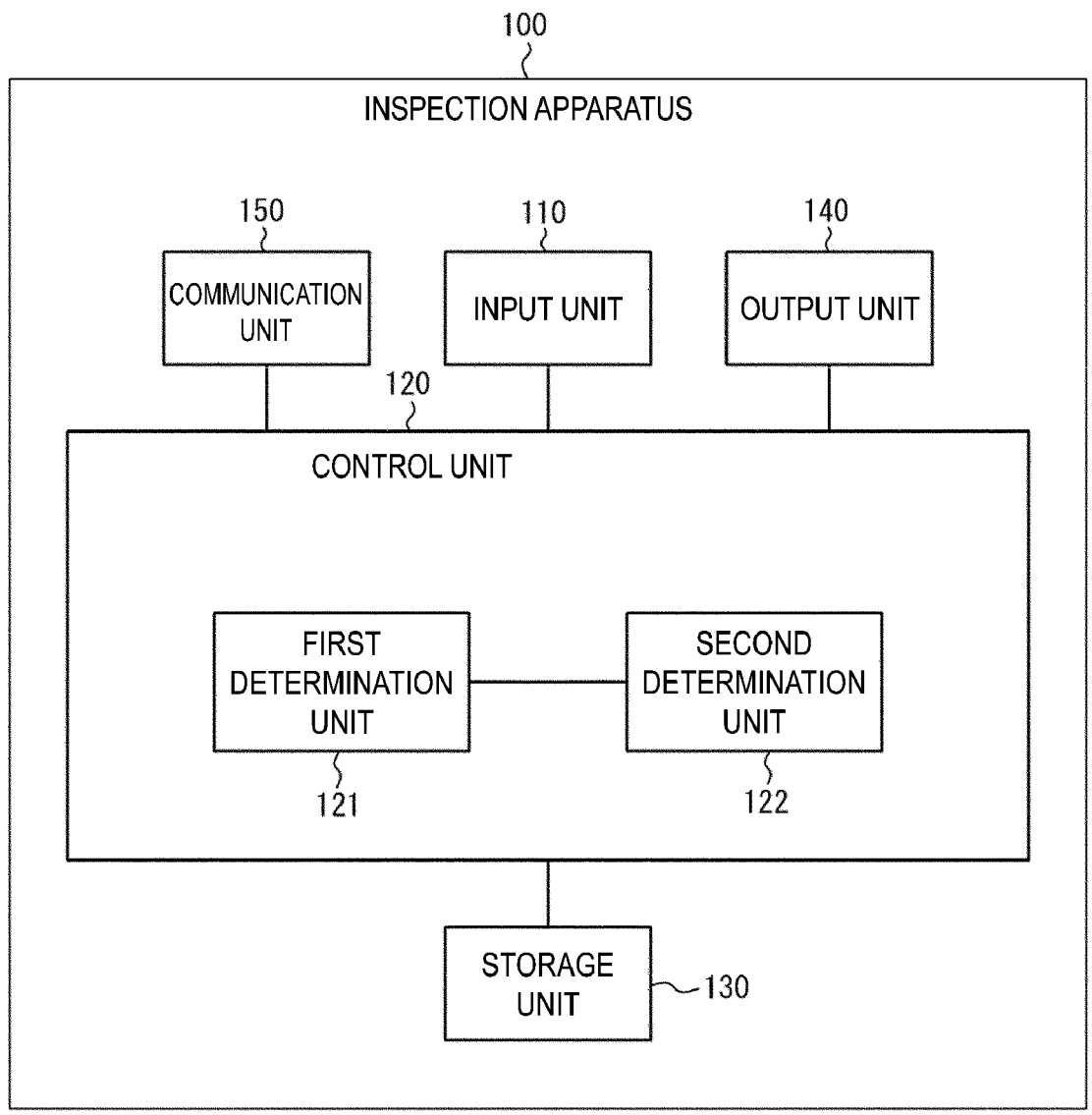
FIG. 2 is a diagram illustrating an exemplary configuration of an inspection apparatus according to the embodiment.

A configuration of the inspection apparatus 100 according to the present embodiment will be described with reference to FIG. 2.

The inspection apparatus 100 is an apparatus for inspecting the inside of the manhole 2 using the unmanned aerial vehicle 1. The inspection apparatus 100 includes an input unit 110, a control unit 120, a storage unit 130, an output unit 140, and a communication unit 150 as illustrated in FIG. 2.

The input unit 110 receives inputs of various types of information. The input unit 110 may be any device as long as it can allow an operator to perform predetermined operations, and may be, for example, a microphone, a touch panel, a keyboard, a mouse, and the like. For example, an operator performs a predetermined operation using the input unit 110 to input, to the control unit 120, distance information indicating the altitude h of the unmanned aerial vehicle 1 with respect to the ground surface A measured by the first rangefinder 101, distance information indicating the altitude H of the unmanned aerial vehicle 1 with respect to the water surface W or the floor surface F measured by the second rangefinder 102, image information of images captured by the camera 103, and the like. The input unit 110 may be integrated with the inspection apparatus 100 or may be provided separately.

The control unit 120 may be configured by dedicated hardware, or may be configured by a versatile processor or a processor specialized in specific processing. Although details of the control unit 120 will be described below, the control unit includes a first determination unit 121 and a second determination unit 122.

The storage unit 130 includes one or more memories, and may include, for example, a semiconductor memory, a magnetic memory, an optical memory, and the like. Each of the memories included in the storage unit 130 may function as, for example, a main storage device, an auxiliary storage device, or a cache memory. The memories need not necessarily each be provided inside the inspection apparatus 100, and may be provided on the outer side of the inspection apparatus 100.

The storage unit 130 stores any information to be used for operations of the inspection apparatus 100. For example, the storage unit 130 stores distance information indicating the altitude h of the unmanned aerial vehicle 1 with respect to the ground surface A measured by the first rangefinder 101, distance information indicating the altitude H of the unmanned aerial vehicle 1 with respect to the water surface W or the floor surface F measured by the second rangefinder 102, image information of images captured by the camera 103, and the like. For example, the storage unit 130 stores inspection information, manhole information, space information, and the like to be described below. The storage unit 130 stores various programs, data, and the like, for example, in addition to the above.

The output unit 140 outputs various types of information. Examples of the output unit 140 include a liquid crystal display, an organic electro-luminescence (EL) display, a speaker, and the like. For example, the output unit 140 displays a predetermined screen based on image information of images captured by the camera 103. The output unit 140 may be integrated with the inspection apparatus 100 or may be provided separately.

The communication unit 150 has a function of communicating with the unmanned aerial vehicle 1. The communication unit 250 receives, from the unmanned aerial vehicle 1, for example, distance information indicating the altitude h of the unmanned aerial vehicle 1 with respect to the ground surface A measured by the first rangefinder 101, distance information indicating the altitude H of the unmanned aerial vehicle 1 with respect to the water surface W or the floor surface F measured by the second rangefinder 102, image information of images captured by the camera 103, and the like. In addition, the communication unit 250 transmits, to the unmanned aerial vehicle 1, for example, a control signal for causing the unmanned aerial vehicle 1 to land on the ground surface A, a control signal for causing the unmanned aerial vehicle 1 to land on the water surface W, a control signal for causing the unmanned aerial vehicle 1 to fly in the space S of the inside of the manhole, a control signal for controlling a flight altitude of the unmanned aerial vehicle 1, and the like.

Configuration of First Determination Unit 121

Figure 3:
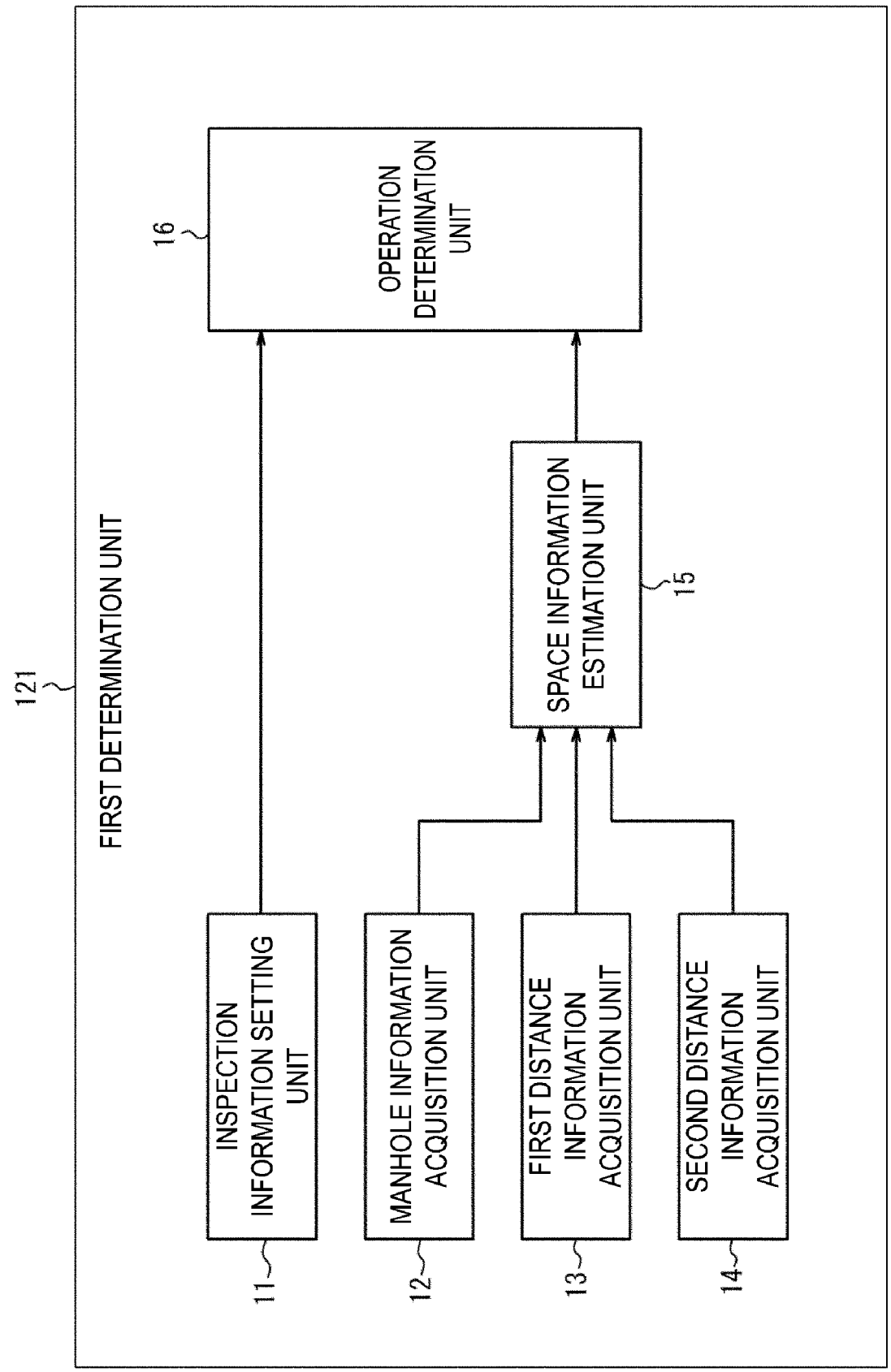
FIG. 3 is a diagram illustrating an exemplary configuration of a first determination unit according to the embodiment.
Figure 4:
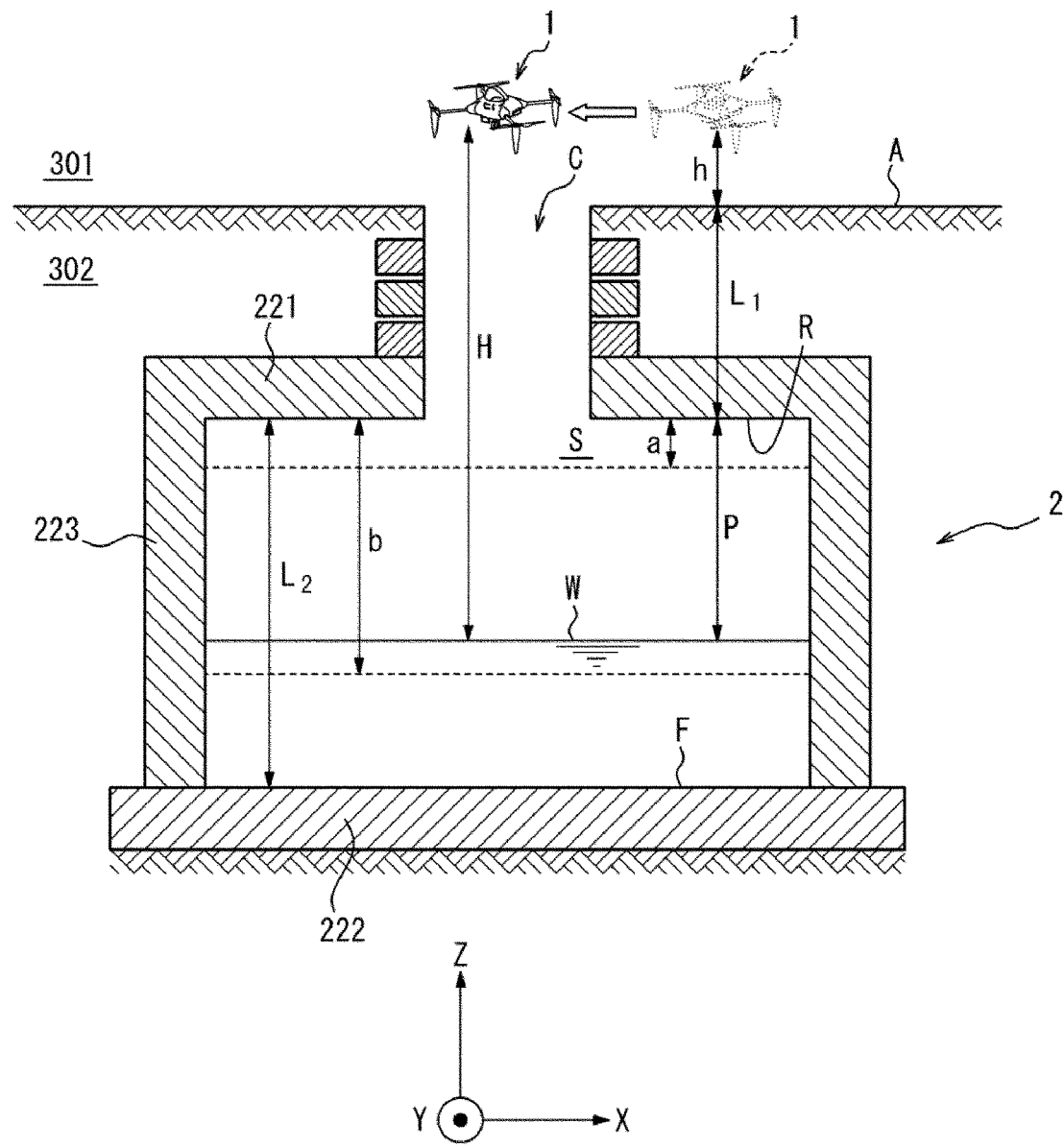
FIG. 4 is a diagram for explaining the first determination unit according to the embodiment.

A configuration of the first determination unit 121 according to the present embodiment will be described with reference to FIGS. 3 and 4.

The first determination unit 121 includes an inspection information setting unit 11, a manhole information acquisition unit 12, a first distance information acquisition unit 13, a second distance information acquisition unit 14, a space information estimation unit 15, and an operation determination unit 16.

The inspection information setting unit 11 sets inspection information indicating a threshold a (first threshold) for determining whether the unmanned aerial vehicle 1 can enter the inside of the manhole 2 and a threshold b (second threshold) for determining whether the unmanned aerial vehicle 1 can land on the water surface W of the pooled water 3 present on the inside of the manhole 2. The inspection information setting unit 11 outputs the set inspection information to the operation determination unit 16.

The threshold a is a value to be used in determining whether the unmanned aerial vehicle 1 can enter the inside of the manhole 2 and is a critical value of space information indicating the space S (for example, a distance from the ceiling surface R to the water surface W) of the inside of the manhole 2. The threshold b is a value used in determining whether the unmanned aerial vehicle 1 can land on the water surface W of the pooled water 3 present on the inside of the manhole 2, and is a critical value of the space information indicating the space S (for example, the distance from the ceiling surface R to the water surface W) of the inside of the manhole 2. In addition, the threshold b may be a maximum distance from the camera 103 that can capture images of the ceiling surface R of the manhole 2 to the ceiling surface R. Further, the threshold b is set to be greater than the threshold a.

For example, if the space information is less than the threshold a, it is determined that the unmanned aerial vehicle 1 cannot enter the inside of the manhole 2. For example, if the space information is equal to or greater than the threshold a and less than or equal to the threshold b, it is determined that the unmanned aerial vehicle 1 can enter the inside of the manhole 2 and land on the water surface W of the pooled water 3 present on the inside of the manhole 2. In addition, if the space information is greater than the threshold b, for example, it is determined that the unmanned aerial vehicle 1 can enter the inside of the manhole 2 and the unmanned aerial vehicle 1 cannot land on the water surface W of the pooled water 3 present on the inside of the manhole 2.

Although the thresholds a and b are not limited to particular values, they are preferably variables. By setting the thresholds a and b while appropriately changing them, the inspection information setting unit 11 can control a capturing range of the camera 103 mounted on the unmanned aerial vehicle 1 as desired. When the unmanned aerial vehicle 1 land on the water surface W of the pooled water 3 present on the inside of the manhole 2, for example, the threshold a is set to a smaller value to reduce the distance from the unmanned aerial vehicle 1 to the ceiling surface R of the manhole 2. This allows the unmanned aerial vehicle 1 to take a close shot of the ceiling surface R, and thus degradation such as fine cracking occurring in the upper slab 221 of the skeleton part 220 that is one item of the manhole to be inspected can be photographed with high precision. When the unmanned aerial vehicle 1 land on the water surface W of the pooled water 3 present on the inside of the manhole 2, for example, the threshold b is set to a greater value to increase the distance from the unmanned aerial vehicle 1 to the ceiling surface R of the manhole 2. As a result, the unmanned aerial vehicle 1 can capture an image of the entire inside of the manhole 2 in a wide range.

The manhole information acquisition unit 12 acquires manhole information including the burial depth $L_1$ of the manhole 2, the height $L_2$ of the inside of the manhole 2, and the like based on preset specification values of the manhole 2. Alternatively, the manhole information acquisition unit 12 acquires manhole information including the burial depth $L_1$ of the manhole 2, the height $L_2$ of the inside of the manhole 2, and the like from an external device or the like, for example. The manhole information acquisition unit 12 outputs the acquired manhole information to the space information estimation unit 15.

The first distance information acquisition unit 13 acquires distance information indicating the altitude h of the unmanned aerial vehicle 1 with respect to the ground surface A before the unmanned aerial vehicle 1 enters the inside of the manhole 2, that is, when the unmanned aerial vehicle 1 is flying the aboveground 301, from the unmanned aerial vehicle 1. The altitude h of the unmanned aerial vehicle 1 with respect to the ground surface A is measured by, for example, the first rangefinder 101 mounted on the unmanned aerial vehicle 1 described above. The first distance information acquisition unit 13 outputs the acquired distance information to the space information estimation unit 15. Further, the first distance information acquisition unit 112 may acquire the distance information not only from the unmanned aerial vehicle 1, but also from an external device or the like, for example.

The second distance information acquisition unit 14 acquires distance information indicating the altitude H of the unmanned aerial vehicle 1 with respect to the water surface W or the floor surface F before the unmanned aerial vehicle 1 enters the inside of the manhole 2, that is, when the unmanned aerial vehicle 1 is directly above the manhole hole C, from the unmanned aerial vehicle 1. The altitude H of the unmanned aerial vehicle 1 with respect to the water surface W or the floor surface F is measured by, for example, the second rangefinder 102 mounted on the unmanned aerial vehicle 1 described above. The second distance information acquisition unit 14 outputs the acquired distance information to the space information estimation unit 15. Further, the second distance information acquisition unit 14 may acquire the distance information not only from the unmanned aerial vehicle 1, but also from an external device or the like, for example.

The space information estimation unit 15 estimates space information indicating the space S of the inside of the manhole 2 based on the manhole information, the distance information indicating the altitude h, and the distance information indicating the altitude H. The space information is, for example, distance information indicating the distance from the ceiling surface R to the water surface W. The space information estimation unit 15 outputs the estimated space information to the operation determination unit 16. Further, when there is no pooled water 3 in the inside of the manhole 2, the space information corresponds to the distance from the ceiling surface R to the floor surface F (the height $L_2$ of the inside of the manhole 2).

Specifically, the space information estimation unit 15 calculates a distance P between the ceiling surface R and the water surface W using the following equation based on the burial depth $L_1$ of the manhole 2, the height $L_2$ of the inside of the manhole 2, the altitude h of the unmanned aerial vehicle 1 with respect to the ground surface A, and the altitude H of the unmanned aerial vehicle 1 with respect to the water surface W or the ground surface F.

[Math. 1]

$$P = H - h - L_1 \text{ (where } p \leq L_2) \tag{1}$$

The operation determination unit 16 determines an operation of the unmanned aerial vehicle 1 based on inspection information input from the inspection information setting unit 11 and space information input from the space information estimation unit 15. The inspection apparatus 100 generates, for example, a control signal for causing the unmanned aerial vehicle 1 to land on the ground surface A, a control signal for causing the unmanned aerial vehicle 1 to land on the water surface W, a control signal for causing the unmanned aerial vehicle 1 to fly in the space S of the inside of the manhole, and the like based on the determined operation and transmits the control signals to the unmanned aerial vehicle 1, The unmanned aerial vehicle 1 is controlled such that it performs the determined operation based on the control signals.

First, the operation determination unit 16 sets determination conditions based on the threshold a, the threshold b, and the distance P from the ceiling surface R to the water surface W as in the following equations.

[Math. 2]

$$C=0 \ (P>a)$$

$$C=1 \ (a \leq P \leq b)$$

$$C=2 \ (b<P) \quad (2)$$

Next, the operation determination unit 16 determines whether the unmanned aerial vehicle 1 can enter the inside of the manhole 2 and whether the unmanned aerial vehicle 1 can land on the water surface W of the pooled water 3 present on the inside of the manhole 2 based on the determination conditions of the equations (2) and outputs the determination results to the second determination unit 122.

In a case in which C=0 is satisfied, for example, the operation determination unit 16 determines that the unmanned aerial vehicle 1 cannot enter the inside of the manhole 2 and outputs a determination result that the space information is less than the threshold a (first determination result) to the second determination unit 122. By setting C=0 as the determination conditions, a failure of the unmanned aerial vehicle 1 can be prevented in advance.

In a case in which C=1 is satisfied, for example, the operation determination unit 16 determines that the unmanned aerial vehicle 1 can enter the inside of the manhole 2 and the unmanned aerial vehicle 1 can land on the water surface W of the pooled water 3 present on the inside of the manhole 2 and outputs the determination result that the space information is equal to or greater than the threshold a and less than or equal to the threshold b (second determination result) to the second determination unit 122.

In a case in which C=2 is satisfied, for example, the operation determination unit 16 determines that the unmanned aerial vehicle 1 can enter the inside of the manhole 2 but the unmanned aerial vehicle 1 cannot land on the water surface W of the pooled water 3 present on the inside of the manhole 2 and outputs the determination result that the space information is greater than the threshold b (third determination result) to the second determination unit 122.

Next, the operation determination unit 16 determines an operation of the unmanned aerial vehicle 1 based on the determination results.

For example, the operation determination unit 16 determines the operation of the unmanned aerial vehicle 1 so that the unmanned aerial vehicle 1 lands on the ground surface A without entering the inside of the manhole 2 based on the determination result that the unmanned aerial vehicle 1 cannot enter the inside of the manhole 2.

The operation determination unit 16 determines, for example, the operation of the unmanned aerial vehicle 1 so that the unmanned aerial vehicle 1 enters the inside of the manhole 2 and the unmanned aerial vehicle 1 lands on the water surface W of the pooled water 3 present on the inside of the manhole 2 based on the determination result that the unmanned aerial vehicle 1 can enter the inside of the manhole 2 and the unmanned aerial vehicle 1 can land on the water surface W of the pooled water 3 present on the inside of the manhole 2.

The operation determination unit 16 determines, for example, the operation of the unmanned aerial vehicle 1 so that the unmanned aerial vehicle 1 enters the inside of the manhole 2 and the unmanned aerial vehicle 1 flies in the space S of the inside of the manhole 2 based on the determination result that the unmanned aerial vehicle 1 can enter the inside of the manhole 2 and the unmanned aerial vehicle 1 cannot land on the water surface W of the pooled water 3 present on the inside of the manhole 2.

Configuration of Second Determination Unit 122

Figure 5:
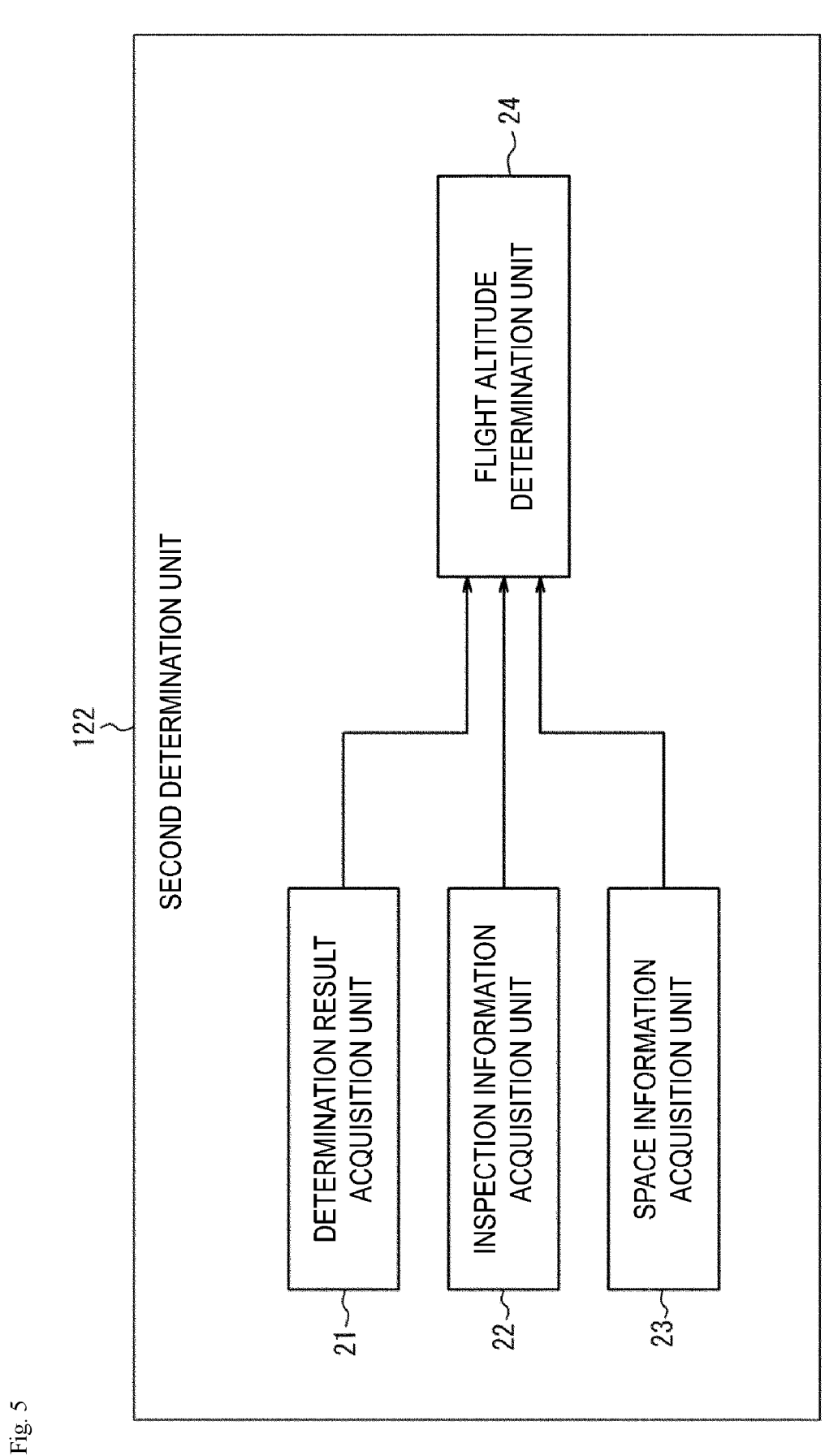
FIG. 5 is a diagram illustrating an exemplary configuration of a second determination unit according to the embodiment.
Figure 6:
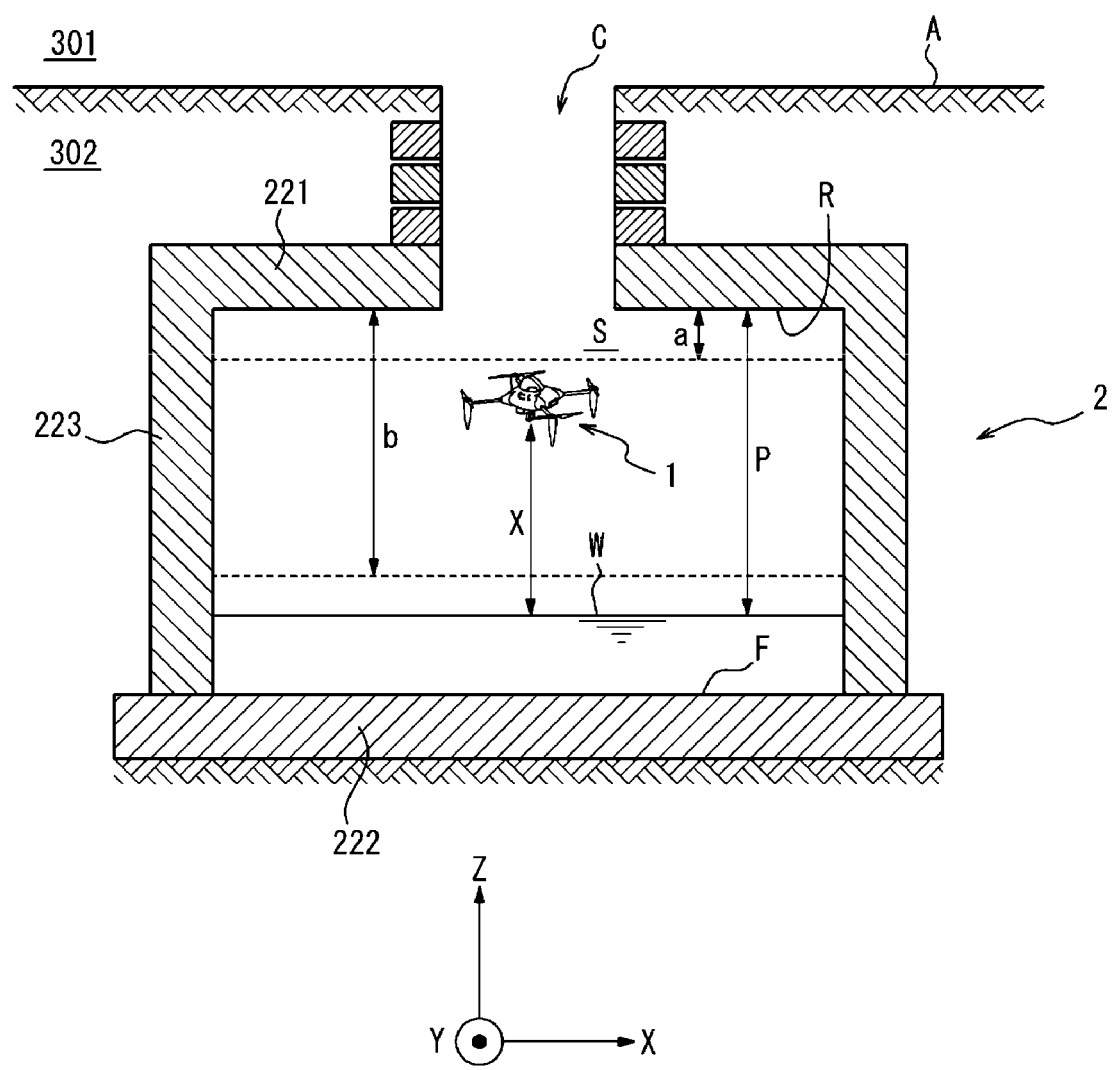
FIG. 6 is a diagram for explaining the second determination unit according to the embodiment.

A configuration of the second determination unit 122 according to the present embodiment will be described with reference to FIGS. 5 and 6.

The second determination unit 122 includes a determination result acquisition unit 21, an inspection information acquisition unit 22, a space information acquisition unit 23, and a flight altitude determination unit 24.

The determination result acquisition unit 21 acquires determination results from the first determination unit 121. The determination result acquisition unit 21 outputs the acquired determination results to the flight altitude determination unit 24.

For example, the determination result acquisition unit 21 acquires the determination result that C=0 is satisfied, that is, the unmanned aerial vehicle 1 cannot enter the inside of the manhole 2 (the determination result that the space information is less than the threshold a), from the first determination unit 121. For example, the determination result acquisition unit 21 acquires the determination result that C=1 is satisfied, that is, the unmanned aerial vehicle 1 can enter the inside of the manhole 2 and the unmanned aerial vehicle 1 can land on the water surface W of the pooled water 3 present on the inside of the manhole 2 (the determination result that the space information is equal to or greater than the threshold a and less than or equal to the threshold b), from the first determination unit 121. For example, the determination result acquisition unit 21 acquires the determination result that C=2 is satisfied, that is, the unmanned aerial vehicle 1 can enter the inside of the manhole 2 and the unmanned aerial vehicle 1 cannot land on the water surface W of the pooled water 3 present on the inside of the manhole 2 (the determination result that the space information is greater than the threshold b), from the first determination unit 121.

The inspection information acquisition unit 22 acquires the inspection information indicating the threshold a for determining whether the unmanned aerial vehicle 1 can enter the inside of the manhole 2 and the threshold b for determining whether the unmanned aerial vehicle 1 can land on the water surface W of the pooled water 3 present on the inside of the manhole 2, the threshold b indicating the maximum distance from the camera 103 that can capture images of the ceiling surface R of the manhole 2 to the ceiling surface R from the first determination unit 121. The inspection information acquisition unit 22 outputs the acquired inspection information to the flight altitude determination unit 24.

The space information acquisition unit 23 acquires space information indicating the space S of the inside of the manhole 2 from the first determination unit 121. The space information acquisition unit 23 outputs the acquired space information to the flight altitude determination unit 24.

The flight altitude determination unit 24 determines the flight altitude X of the unmanned aerial vehicle 1 with respect to the water surface W or the floor surface F after the unmanned aerial vehicle 1 enters the inside of the manhole 2, that is, when the unmanned aerial vehicle 1 is flying in the space S of the inside of the manhole 2, based on the determination result input from the determination result acquisition unit 21, the inspection information input from the inspection information acquisition unit 22, and the space information input from the space information acquisition unit 23.

Specifically, in a case in which the determination result input from the determination result acquisition unit 21 is that C=2 is satisfied, the flight altitude determination unit 24 uses the following equation to determine the flight altitude X of the unmanned aerial vehicle 1 with respect to the water surface W or the floor surface F after the unmanned aerial vehicle 1 enters the inside of the manhole 2 based on the threshold a, the threshold b, and the distance P from the ceiling surface R to the water surface W. On the other hand, in a case in which the determination result input from the determination result acquisition unit 21 is that C=0 or C=1 is satisfied, the flight altitude determination unit 24 does not determine the flight altitude X of the unmanned aerial vehicle 1 with respect to the water surface W or the floor surface F after the unmanned aerial vehicle 1 enters the inside of the manhole 2.

[Math. 3]

$$P-b \leq X \leq P-a \qquad (3)$$

In a case in which the determination result input from the determination result acquisition unit 21 is that C=2 is satisfied, the flight altitude determination unit 24 determines the flight altitude X of the unmanned aerial vehicle 1 with respect to the water surface W or the floor surface F after the unmanned aerial vehicle 1 enters the inside of the manhole 2 such that the flight altitude is in the range from the difference between the space information and the threshold b to the difference between the space information and the threshold a as indicated by the equation (3). The inspection apparatus 100 generates a control signal for controlling the flight altitude of the unmanned aerial vehicle 1, for example, based on the determined flight altitude X and transmits the control signal to the unmanned aerial vehicle 1. The unmanned aerial vehicle 1 is controlled such that it flies while maintaining the determined flight altitude X based on the control signal.

Further, as the inspection information setting unit 11 sets the thresholds a and b while appropriately changing the values, it is possible to control the flight altitude X of the unmanned aerial vehicle 1 with respect to the water surface W or the floor surface F after the unmanned aerial vehicle 1 enters the inside of the manhole 2 as desired. If the threshold a is set to a smaller value and the threshold b is set to a greater value, for example, the flight altitude X can have a value in a wider range, and thus the unmanned aerial vehicle 1 can fly in the space S of the inside of the manhole 2 in a wider range.

In the inspection apparatus 100 according to the present embodiment, the first determination unit 121 determines an operation of the unmanned aerial vehicle 1 based on the first threshold, the second threshold, and the space information, and if the operation is to enter the inside of the manhole 2 and fly in the space S of the inside of the manhole 2, the second determination unit 122 determines the flight altitude of the unmanned aerial vehicle 1. Thus, an operation of the unmanned aerial vehicle 1 can be appropriately determined in accordance with the state of the inside of the manhole 2, so that, for example, the unmanned aerial vehicle lands on the ground surface without causing it to enter the manhole when it is full, the unmanned aerial vehicle lands on the water surface when the depth of the pooled water is deep, the unmanned aerial vehicle flies in the space S of the inside of the manhole 2 when the depth of the pool water is shallow, or the like. As a result, the operator can inspect the inside of the manhole 2 using images in which appropriate spots have been captured before causing the unmanned aerial vehicle 1 to enter the inside of the manhole 2 without measuring the depth of the pooled water in the inside of the manhole 2 or draining the pooled water from the inside of the manhole. Therefore, efficiency of the inspection work can be achieved.

Inspection Method

An exemplary inspection method according to the present embodiment will be described with reference to FIG. 7.

In step S101, the first determination unit 121 sets inspection information indicating the threshold a for determining whether the unmanned aerial vehicle 1 can enter the inside of the manhole 2 and the threshold b for determining whether the unmanned aerial vehicle 1 can land on the water surface W of the pooled water 3 present on the inside of the manhole 2, the threshold b indicating the maximum distance from the camera 103 that can capture images of the ceiling surface R of the manhole 2 to the ceiling surface R.

In step S102, the first determination unit 121 acquires manhole information including the burial depth $L_1$ of the manhole 2, the height $L_2$ of the inside of the manhole 2, and the like, based on preset specification values of the manhole 2.

In step S103, the first determination unit 121 acquires distance information indicating the altitude h of the unmanned aerial vehicle 1 with respect to the ground surface A before the unmanned aerial vehicle 1 enters the inside of the manhole 2, that is, when the unmanned aerial vehicle 1 is flying the aboveground 301, from the unmanned aerial vehicle 1.

In step S104, the first determination unit 121 acquires distance information indicating the altitude H of the unmanned aerial vehicle 1 with respect to the water surface W or the floor surface F before the unmanned aerial vehicle 1 enters the inside of the manhole 2, that is, when the unmanned aerial vehicle 1 is flying directly above the manhole hole C, from the unmanned aerial vehicle 1.

In step S105, the first determination unit 121 estimates space information indicating the space S of the inside of the manhole 2 based on the manhole information, the distance information indicating the altitude h, and the distance information indicating the altitude H.

In step S106, the first determination unit 121 determines an operation of the unmanned aerial vehicle 1 based on the inspection information and the space information.

For example, the first determination unit 121 determines the operation of the unmanned aerial vehicle 1 so that the unmanned aerial vehicle 1 lands on the ground surface A without entering the inside of the manhole 2 based on the determination result that the unmanned aerial vehicle 1 cannot enter the inside of the manhole 2. The first determination unit 121 determines, for example, the operation of the unmanned aerial vehicle 1 in such a manner that the unmanned aerial vehicle 1 enters the inside of the manhole 2 and the unmanned aerial vehicle 1 lands on the water surface W of the pooled water 3 present on the inside of the manhole 2 based on the determination result that the unmanned aerial vehicle 1 can enter the inside of the manhole 2 and the unmanned aerial vehicle 1 can land on the water surface W of the pooled water 3 present on the inside of the manhole 2. The first determination unit 121 determines, for example, the operation of the unmanned aerial vehicle 1 so that the unmanned aerial vehicle 1 enters the inside of the manhole 2 and the unmanned aerial vehicle 1 flies in the space S of the inside of the manhole 2 based on the determination result that the unmanned aerial vehicle 1 can enter the inside of the manhole 2 and the unmanned aerial vehicle 1 can land on the water surface W of the pooled water 3 present on the inside of the manhole 2.

In step S107, the second determination unit 122 acquires a determination result indicating that the space information is less than the threshold a, a determination result indicating that the space information is equal to or greater than the threshold a and less than or equal to the threshold b, or a determination result indicating that the space information is greater than the threshold b from the first determination unit 121.

In step S108, the second determination unit 122 acquires the inspection information indicating the threshold a for determining whether the unmanned aerial vehicle 1 can enter the inside of the manhole 2 and the threshold b for determining whether the unmanned aerial vehicle 1 can land on the water surface W of the pooled water 3 present on the inside of the manhole 2. The threshold b indicates the maximum distance from the camera 103 that can capture images of the ceiling surface R of the manhole 2 to the ceiling surface R from the first determination unit 121.

In step S109, the second determination unit 122 acquires the space information indicating the space S of the inside of the manhole 2 from the first determination unit 121.

In step S110, if the determination result is that C=2 is satisfied based on the determination result, the inspection information, and the space information, the second determination unit 122 determines the flight altitude X of the unmanned aerial vehicle 1 with respect to the water surface W or the floor surface F after the unmanned aerial vehicle 1 enters the inside of the manhole 2, that is, when the unmanned aerial vehicle 1 is flying in the space S of the inside of the manhole 2.

According to the inspection method of the present embodiment, an operation of the unmanned aerial vehicle 1 can be appropriately determined in accordance with the state of the inside of the manhole 2, so that, for example, the unmanned aerial vehicle lands on the ground surface without entering the manhole when the water is full, the unmanned aerial vehicle lands on the water surface when the depth of the pooled water is deep, the unmanned aerial vehicle flies in the space of the inside of the manhole 2 when the depth of the pool water is shallow, or the like.

Modification

Although the configuration in which the first determination unit 121 determines an operation of the unmanned aerial vehicle 1 based on inspection information set by the inspection information setting unit 11 and space information estimated by the space information estimation unit 15 has been described as an example in the present embodiment, the invention is not limited to the configuration. The first determination unit 121 may be configured to determine an operation of the unmanned aerial vehicle 1 based on, for example, inspection information set by the inspection information setting unit 11 and space information measured manually by an operator using an instrument such as a measuring instrument.

In addition, although the configuration in which the flight altitude X of the unmanned aerial vehicle 1 with respect to the water surface W or the floor surface F is determined by the second determination unit 122 based on inspection information set by the inspection information setting unit 11 and space information estimated by the space information estimation unit 15 in the case in which the determination result determined based on the inspection information and the space information satisfies C=2 has been described as an example in the present embodiment, the invention is not limited to the configuration. In the case in which a determination result determined based on inspection information set by the inspection information setting unit 11 and space information measured manually by the operator using an instrument such as a measuring instrument, or the like, satisfies C=2, for example, the second determination unit 122 may determine the flight altitude X of the unmanned aerial vehicle 1 with respect to the water surface W or the floor surface F based on the inspection information and the space information.

Further, although the configuration in which the inspection apparatus 100 and the unmanned aerial vehicle 1 are provided separately has been described as an example in the present embodiment, the inspection apparatus 100 and the unmanned aerial vehicle 1 may be integrally provided.

Other Modification

The present invention is not limited to the above embodiment and modifications. For example, the various processes described above may be executed not only in chronological order as described but also in parallel or in an individual manner as necessary or depending on the processing capabilities of the apparatuses that execute the processes. In addition, change can be made appropriately without departing from the spirit of the present invention.

Program and Recording Medium

It is also possible to use a computer that can execute program instructions to function as in the above-described embodiment and modifications. The computer may be implemented by storing a program describing the processing details for implementing the functions of each of devices in a storage unit of the computer, and reading and executing the program using the processor of the computer, and at least a part of these processing details may be implemented by hardware. Here, examples of the computer may include a versatile computer, a dedicated computer, a workstation, a PC, an electronic notepad, or the like. The program instructions may be program codes, code segments, and the like to perform required tasks. Examples of the processor may include a central processing unit (CPU), a graphics processing unit (GPU), a digital signal processor (DSP), an application specific integrated circuit (ASIC), and the like.

Figure 7:
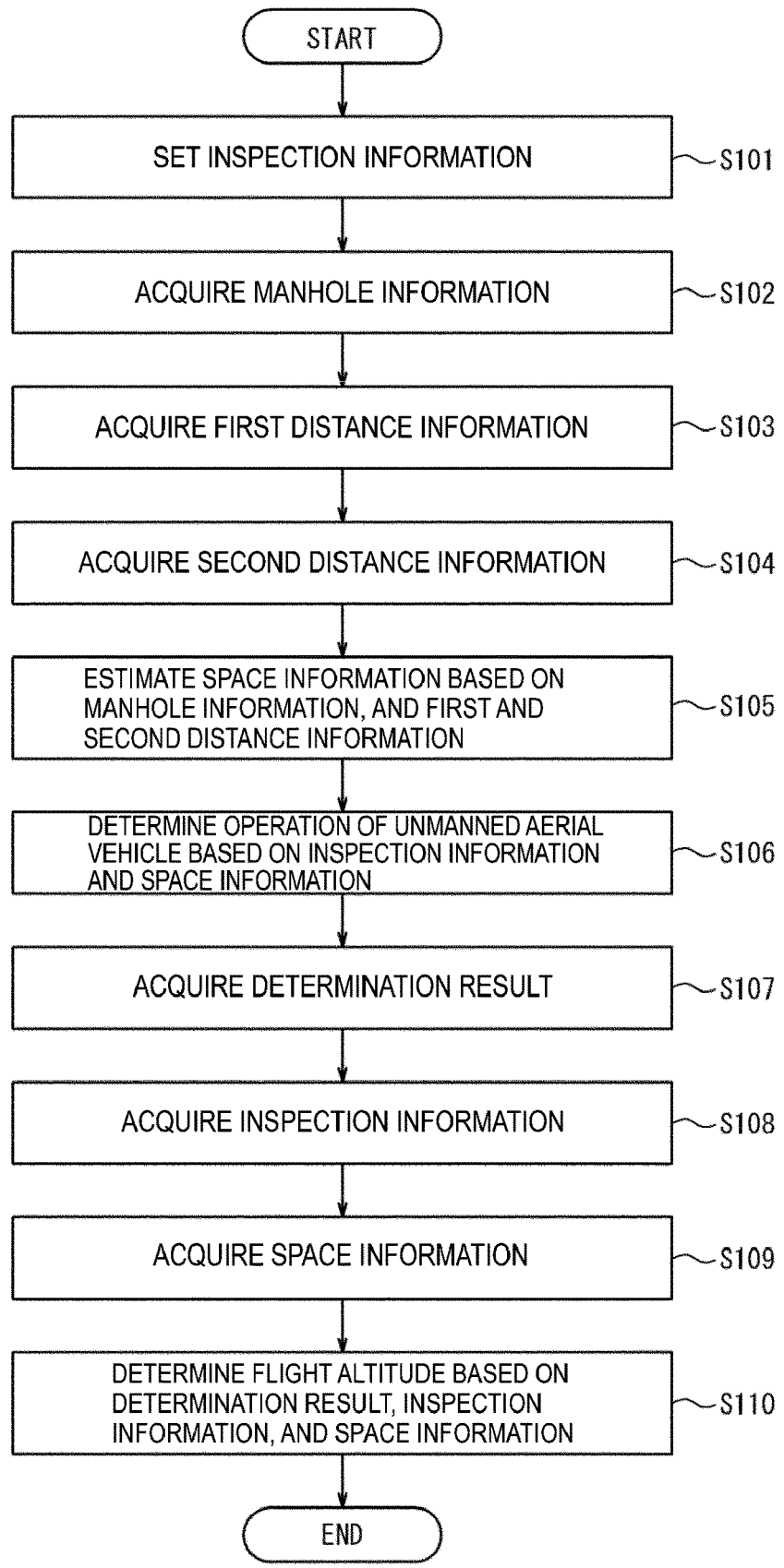
FIG. 7 is a flowchart showing an exemplary inspection method according to the embodiment.

A program for causing a computer to perform the above-described inspection method is, for example, with reference to FIG. 7, an inspection method for inspecting the inside of a manhole using an unmanned aerial vehicle, including determining an operation of the unmanned aerial vehicle based on a first threshold for determining whether the unmanned aerial vehicle can enter the inside, a second threshold, which is greater than the first threshold, for determining whether the unmanned aerial vehicle can land on a water surface of pooled water in the inside, and space information indicating a space of the inside (S101 to S106), and determining a flight altitude of the unmanned aerial vehicle with respect to the water surface or a floor surface of the manhole after the unmanned aerial vehicle enters the inside based on the first threshold, the second threshold, and the space information in a case in which it has been determined that the unmanned aerial vehicle can enter the inside and cannot land on the water surface (S107 to S110).

In addition, the program may be recorded in a computer-readable recording medium. Use of such a recording medium makes it possible to install the program on a computer. Here, the recording medium on which the program is recorded may be a non-transitory recording medium. The non-transient recording medium may be a compact disk (CD)-read only memory (ROM), a digital versatile disc (DVD)-ROM, a Blu-ray (trade name) disc (BD)-ROM, and the like. In addition, the program may also be provided by downloading the program via a network.

Although the above embodiment has been described as a representative example, it is apparent to those skilled in the art that many changes and substitutions are possible without departing from the spirit and scope of the present disclosure. Therefore, the present invention should not be construed as being limited by the embodiment described above, and various modifications and changes can be made without departing from the claims. For example, a plurality of constituent blocks described in the configuration diagrams of the embodiment can be combined into one or one constituent block can be divided. In addition, a plurality of processes described in the flowchart of the embodiment may be combined into one process, or one process may be divided.

REFERENCE SIGNS LIST

1 Main body
2 Manhole
11 Inspection information setting unit
12 Manhole information acquisition unit
13 First distance information acquisition unit
14 Second distance information acquisition unit
15 Space information estimation unit
16 Operation determination unit
21 Determination result acquisition unit
22 Inspection information acquisition unit
23 Space information acquisition unit
24 Flight altitude determination unit
100 Inspection apparatus
101 First rangefinder
102 Second rangefinder
103 Camera
104 Flight control unit
110 Input unit
120 Control unit
121 First determination unit
122 Second determination unit
130 Storage unit
140 Output unit
150 Communication unit
210 Neck part
220 Skeleton part
221 Upper slab
222 Lower slab
223 Sidewall part
301 Aboveground
302 Underground

The invention claimed is:

1. An inspection apparatus configured to inspect an inside of a manhole using an unmanned aerial vehicle, the inspection apparatus comprising a processor configured to execute a method comprising:
   determining an operation of the unmanned aerial vehicle based on:
      a first threshold for determining whether the unmanned aerial vehicle can enter the inside,
      a second threshold for determining whether the unmanned aerial vehicle can land on a water surface of pooled water in the inside, and
      space information indicating a space of the inside, the second threshold being greater than the first threshold; and
   determining a flight altitude of the unmanned aerial vehicle with respect to the water surface or a floor surface of the manhole after the unmanned aerial vehicle enters the inside based on the first threshold, the second threshold, and the space information in a case in which it has been determined that the unmanned aerial vehicle can enter the inside and land on the water surface; and
   operating, based on the determined operation and the determined flight altitude, the unmanned aerial vehicle.

2. The inspection apparatus according to claim 1, wherein the determining an operation of the unmanned aerial vehicle further comprises:
   setting the first threshold and the second threshold;
   acquiring manhole information including a burial depth of the manhole and a height of the inside;
   acquiring first distance information indicating a first altitude of the unmanned aerial vehicle with respect to a ground surface before the unmanned aerial vehicle enters the inside;
   acquiring second distance information indicating a second altitude of the unmanned aerial vehicle with respect to the water surface or the floor surface before the unmanned aerial vehicle enters the inside;
   estimating the space information based on the manhole information, the first distance information, and the second distance information; and
   the processor further configured to execute a method comprising:
      determining, in a case in which the space information is less than the first threshold, that the unmanned aerial vehicle cannot enter the inside and that the unmanned aerial vehicle should land on the ground surface without entering the inside;
      determining, in a case in which the space information is equal to or greater than the first threshold and less than or equal to the second threshold, that the unmanned aerial vehicle can enter the inside and the unmanned aerial vehicle can land on the water surface, and that the unmanned aerial vehicle should enter the inside and land on the water surface; and
      determining, in a case in which the space information is greater than the second threshold, that the unmanned aerial vehicle can enter the inside but cannot land on the water surface, and that the unmanned aerial vehicle should enter the inside and fly in the space.

3. The inspection apparatus according to claim 2, wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

4. The inspection apparatus according to claim 1, wherein the determining a flight altitude of the unmanned aerial vehicle further comprises:
   acquiring at least one of a first determination result indicating that the space information is less than the first threshold, a second determination result indicating that the space information is equal to or greater than the first threshold and less than or equal to the second threshold, or a third determination result indicating that the space information is greater than the second threshold, and the processor further configured to execute a method comprising:
acquiring the first threshold and the second threshold;
acquiring the space information; and
determining the flight altitude so that the flight altitude satisfies a range from a difference between the space information and the second threshold to a difference between the space information and the first threshold when having acquired the third determination result.

5. The inspection apparatus according to claim 4, wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

6. The inspection apparatus according to claim 1, wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

7. The inspection apparatus according to claim 1, the processor further configured to execute a method comprising:
determining the operation of the unmanned aerial vehicle when the unmanned aerial vehicle is flying above the manhole.

8. A computer implemented method for inspecting an inside of a manhole using an unmanned aerial vehicle, the method comprising:
determining an operation of the unmanned aerial vehicle based on:
a first threshold for determining whether the unmanned aerial vehicle can enter the inside,
a second threshold for determining whether the unmanned aerial vehicle can land on a water surface of pooled water in the inside, and
space information indicating a space of the inside, the second threshold being greater than the first threshold; and
determining a flight altitude of the unmanned aerial vehicle with respect to the water surface or a floor surface of the manhole after the unmanned aerial vehicle enters the inside based on the first threshold, the second threshold, and the space information in a case in which it has been determined that the unmanned aerial vehicle can enter the inside and land on the water surface; and
operating, based on the determined operation and the determined flight altitude, the unmanned aerial vehicle.

9. The computer implemented method according to claim 5, wherein the determining the operation of the unmanned aerial vehicle further comprises:

setting the first threshold and the second threshold;
acquiring manhole information including a burial depth of the manhole and a height of the inside;
acquiring first distance information indicating a first altitude of the unmanned aerial vehicle with respect to a ground surface before the unmanned aerial vehicle enters the inside;
acquiring second distance information indicating a second altitude of the unmanned aerial vehicle with respect to the water surface or the floor surface before the unmanned aerial vehicle enters the inside;
estimating the space information based on the manhole information, the first distance information, and the second distance information; and
the method further comprising:
determining, in a case in which the space information is less than the first threshold, that the unmanned aerial vehicle cannot enter the inside and that the unmanned aerial vehicle should land on the ground surface without entering the inside;
determining, in a case in which the space information is equal to or greater than the first threshold and less than or equal to the second threshold, that the unmanned aerial vehicle can enter the inside and land on the water surface, and that the unmanned aerial vehicle should enter the inside and land on the water surface;
and
determining, in a case in which the space information is greater than the second threshold, that the unmanned aerial vehicle can enter the inside but cannot land on the water surface, and that the unmanned aerial vehicle should enter the inside and fly in the space.

10. The computer implemented method according to claim 9,
wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

11. The computer implemented method according to claim 8, wherein the determining of the flight altitude further comprises:
acquiring a first determination result indicating that the space information is less than the first threshold, a second determination result indicating that the space information is equal to or greater than the first threshold and less than or equal to the second threshold, or a third determination result indicating that the space information is greater than the second threshold;
acquiring the first threshold and the second threshold;
acquiring the space information; and
determining the flight altitude so that the flight altitude satisfies a range from a difference between the space information and the second threshold to a difference between the space information and the first threshold in a case in which the third determination result has been acquired.

12. The computer implemented method according to claim 11,
wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

13. The computer implemented method according to claim 8, the processor further configured to execute a method comprising:
  determining the operation of the unmanned aerial vehicle when the unmanned aerial vehicle is flying above the manhole.

14. The computer implemented method according to claim 8,
  wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

15. A computer-readable non-transitory recording medium storing computer-executable program instruction that when executed by a processor cause a computer execute a method comprising:
  determining an operation of the unmanned aerial vehicle based on:
    a first threshold for determining whether the unmanned aerial vehicle can enter the inside,
    a second threshold for determining whether the unmanned aerial vehicle can land on a water surface of pooled water in the inside, and
    space information indicating a space of the inside, the second threshold being greater than the first threshold; and
  determining a flight altitude of the unmanned aerial vehicle with respect to the water surface or a floor surface of the manhole after the unmanned aerial vehicle enters the inside based on the first threshold, the second threshold, and the space information in a case in which it has been determined that the unmanned aerial vehicle can enter the inside and land on the water surface; and
  operating, based on the determined operation and the determined flight altitude, the unmanned aerial vehicle.

16. The computer-readable non-transitory recording medium according to claim 15, wherein the determining an operation of the unmanned aerial vehicle further comprises:
  setting the first threshold and the second threshold;
  acquiring manhole information including a burial depth of the manhole and a height of the inside;
  acquiring first distance information indicating a first altitude of the unmanned aerial vehicle with respect to a ground surface before the unmanned aerial vehicle enters the inside;
  acquiring second distance information indicating a second altitude of the unmanned aerial vehicle with respect to the water surface or the floor surface before the unmanned aerial vehicle enters the inside;
  estimating the space information based on the manhole information, the first distance information, and the second distance information; and
  the processor further configured to execute a method comprising:
    determining, in a case in which the space information is less than the first threshold, that the unmanned aerial vehicle cannot enter the inside and that the unmanned aerial vehicle should land on the ground surface without entering the inside;
    determining, in a case in which the space information is equal to or greater than the first threshold and less than or equal to the second threshold, that the unmanned aerial vehicle can enter the inside and the unmanned aerial vehicle can land on the water surface, and that the unmanned aerial vehicle should enter the inside and land on the water surface; and
    determining, in a case in which the space information is greater than the second threshold, that the unmanned aerial vehicle can enter the inside but cannot land on the water surface, and that the unmanned aerial vehicle should enter the inside and fly in the space.

17. The computer-readable non-transitory recording medium according to claim 16,
  wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

18. The computer-readable non-transitory recording medium according to claim 15, wherein the determining of the flight altitude further comprises:
  acquiring a first determination result indicating that the space information is less than the first threshold, a second determination result indicating that the space information is equal to or greater than the first threshold and less than or equal to the second threshold, or a third determination result indicating that the space information is greater than the second threshold;
  acquiring the first threshold and the second threshold;
  acquiring the space information; and
  determining the flight altitude so that the flight altitude satisfies a range from a difference between the space information and the second threshold to a difference between the space information and the first threshold in a case in which the third determination result has been acquired.

19. The computer-readable non-transitory recording medium according to claim 18,
  wherein the first threshold indicates a first critical value of a distance from a ceiling surface of an upper slab of the manhole to the water surface, and the second threshold indicates a second critical value of a distance from the ceiling surface of the upper slab of the manhole to the water surface and a maximum distance from a camera that captures an image of the ceiling surface to the ceiling surface.

20. The computer-readable non-transitory recording medium according to claim 15, the computer-executable program instructions when executed further causing a computer to execute a method comprising:
  determining the operation of the unmanned aerial vehicle when the unmanned aerial vehicle is flying above the manhole.

* * * * *